3,301,361
INDEXING MECHANISM
Jacques Campion, Livry-Gargan, France, assignor to Burroughs Corporation, Detroit, Mich., a corporation of Michigan
Filed Apr. 16, 1965, Ser. No. 448,607
11 Claims. (Cl. 192—22)

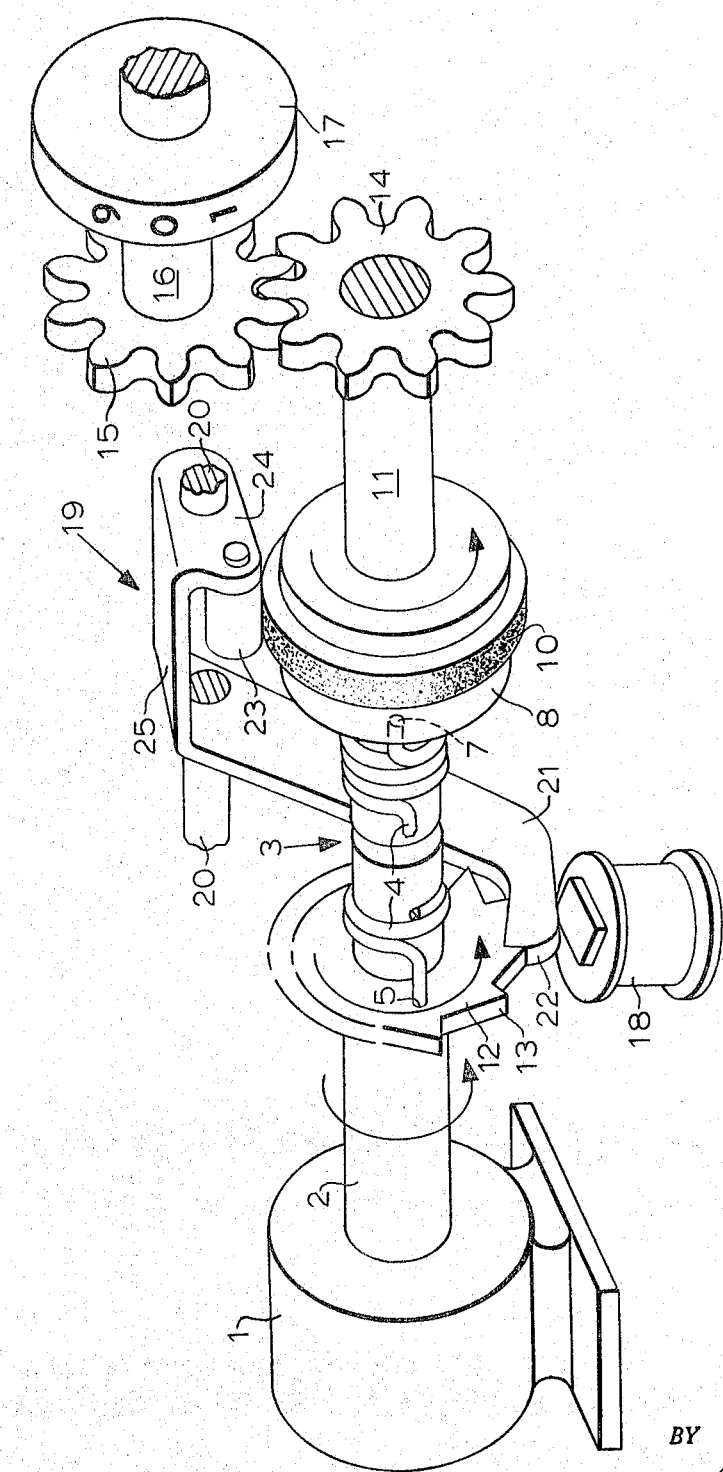

The present invention relates generally to a mechanism for controlling the rotation of rotatable means, and relates more particularly to an apparatus for controlling the indexing of a toothed wheel.

In various mechanical mechanisms, and especially in accounting machines, it is necessary to rotate a wheel having a plurality of teeth on its periphery from one particular tooth to another particular tooth very quickly and accurately. Prior devices attempting to solve this problem have employed springs incorporated in the particular mechanism. Important disadvantages of these prior mechanisms are the poor repeatability, and the relatively slow and non-constant response of the springs.

It is therefore an important object of the invention to provide a rapid and accurate control of the rotation of any rotatable means.

The present invention provides a rotary positioning apparatus which includes a first member having at least one projection, and a second member having a resilient element. Driving means, such as a motor and clutch, are provided to urge the first and second members to rotate. There is provided a pivotal member having first and second arms. The first arm normally engages the projection of the first member to prevent the first member from rotating. The second arm normally penetrates slightly the resilient element and is adapted to penetrate deeper into the resilient element at predetermined times. There is provided a control device which is adapted to urge the first arm out of engagement with the projection and to hold the first arm out of engagement with the projection against the pressure of the resilient element on the second arm. The control device may be a magnetic device, an electromechanical device or purely a mechanical device, such as a cam arrangement.

Furthermore, the present invention provides a mechanism for controlling the rotation of rotatable means. The rotatable means has projections on the periphery of a first element, and an elastic material on the periphery of a second element. Motive means is provided for urging the rotatable means to rotate. There are also provided a magnetic device disposed adjacent the projections, and a pivotable member having a first arm disposed between the magnetic device and the projections and a second arm disposed adjacent the elastic material. The first arm engages at least one of the projections when the magnetic device is unenergized, thus preventing the rotatable means from rotating under the urge of the motive means. The first arm is drawn away from the projections and toward the magnetic device when the magnetic device is energized, thus permitting the rotatable means to rotate under the urge of the motive means. The second arm of the pivotable member is slightly penetrating the elastic material when the magnetic device is unenergized. The second arm penetrates deeper into the elastic material when the magnetic device is energized. Upon de-energization of the magnetic device, the second arm is thrust toward the outer surface of the elastic material thereby pivoting the pivotal member to bring the first arm into engagement with at least one of the projections to stop the rotation of the rotatable means.

Moreover, the present invention provides an indexing apparatus including a motor, a toothed wheel mounted for rotation, and rotatable means connected to the toothed wheel and adapted to rotate therewith. The rotatable means has a layer of resilient material affixed to its cylindrical periphery. A clutch connects the motor to either the rotatable means or to the toothed wheel. A solenoid is provided and arranged adjacent the toothed wheel. A bifurcated armature is pivotally mounted adjacent the toothed wheel. The armature has a first arm adapted to engage the teeth on the toothed wheel and to move out of engagement with the teeth when the solenoid is energized. The armature also has a second arm which carries an element adapted to penetrate the layer of resilient material at predetermined times. The toothed wheel may thus be indexed or rotated rapidly for a distance equal to a predetermined number of teeth of the wheel and then stopped rapidly when the solenoid is de-energized.

Furthermore, the present invention provides an escapement device which comprises a wheel having a plurality of projections equally spaced about its periphery, and rotatable means connected to the wheel and having a cylindrical periphery composed of a yieldable substance. Means are provided, such as a motor and clutch arrangement, for urging the wheel and rotatable means to rotate. A pivotal member is provided having first and second arms. The first arm normally engages at least one of the projections to prevent the wheel from rotating. The second arm normally engages slightly the yieldable substance, but is adapted to engage deeper into the yieldable substance when the wheel is free to rotate. A solenoid is provided which is adapted to urge the first arm out of engagement with the projections when the solenoid is energized.

Another object is to provide an indexing mechanism which permits a wheel to be rotated at a high speed and to be started and stopped substantially instantaneously.

A further object of the invention is to provide an escapement device including a layer of resilient material mounted on a rotatable member, and which resilient material produces an extremely fast spring-like action.

Another object is to provide a high speed single cycle control mechanism having no springs for use in a calculating machine.

Other and further important objects of the invention will become apparent from the disclosure and the following detailed specification, appended claims and accompanying drawing, wherein:

The single figure shows an isometric drawing of an arrangement embodying the novel indexing mechanism.

The following description and FIGURE 1 disclose only one possible embodiment of the present invention. Referring to FIGURE 1, a motor 1 is provided having a driveshaft 2. A spring clutch 3 is provided wherein the spring 4 has one end 5 affixed to a toothed wheel 12 which is free to rotate on the motor driveshaft 2, and wherein the other end 7 of the spring 4 is affixed to a rotatable element 8. The clutch 3 shown is the conventional spring-type clutch arrangement.

Affixed to the cylindrical periphery of element 8 is a resilient belt or a layer 10 of a resilient or elastic material, such as neoprene or rubber. The rotatable element 8 is rigidly affixed to a driven shaft 11.

Axially displaced from the element 8 and free to rotate on the driveshaft 2 is the wheel 12 having a plurality of projections or teeth 13 spaced equally about its periphery. It is desired to rapidly rotate the toothed wheel 12 from one tooth position to another tooth position. In accounting machines such a wheel may have ten teeth corresponding to the digits 0, 1, 2, 3, 4, 5, 6, 7, 8 and 9. The problem of controlling the rotation of the toothed wheel 12 for rotation, for example, from tooth number "1" to the adjacent tooth number "2" and yet achieve high speed has not been achieved by prior art devices.

Axially displaced from the rotatable element 8 and securely affixed to the driven shaft 11 is a gear 14. The gear 14 meshes with a corresponding gear 15 affixed to a shaft 16. The shaft 16 has affixed thereto a utilization device, such as an indicator wheel 17.

A magnetic device, such as a solenoid 18, is disposed adjacent the teeth 13 on the wheel 12. A bifurcated armature 19 is pivotally mounted on a shaft 20. One arm 21 of the armature 19 has its end 22 disposed between the teeth 13 on the wheel 12 and the solenoid 18. When the solenoid 18 is not energized, the end 22 of the arm 21 engages the teeth 13 of the wheel 12 and prevents the wheel 12 from rotating under the urge of the motive means, comprising the motor 1 and clutch 3. In this position, when the solenoid 18 is not energized, a roller 23 mounted on the end 24 of a second arm 25 of the pivotal armature 19 is slightly engaged into the layer 10 of resilient material.

When the solenoid 18 is energized, the arm 21 is drawn out of engagement with the teeth 13 of the wheel 12 and toward the energized solenoid 18 under the influence of the magnetic field. This causes the armature 19 to pivot about its shaft 20 and to bring the roller 23 deeper into engagement with the layer 10 of resilient material. When the arm 21 is drawn out of engagement with the teeth 13, the wheel 12 together with the rotatable element 8 are permitted to rotate rapidly at the speed of the motor driveshaft 2.

The roller 23 mounted on the arm 25 embeds itself into the layer 10 of resilient material. The high speed of the rotatable element 8 augments the force exerted by the resilient material on the roller 23 tending to thrust the roller 23 out of engagement with the resilient material. Disengagement of the roller 23 from the resilient material is prevented by the energized solenoid 18 which holds the arm 21 by a magnetic force. When the solenoid 18 is deenergized, the force acting on the roller 23 is permitted to thrust rapidly the roller 23 toward the outer surface of layer 10 of resilient material, thus producing a spring-like effect. When this occurs, the armature 19 is pivoted, thereby bringing the arm 21 back into engagement with a tooth 13 on the wheel 12 and again preventing rotation of the wheel 12.

It can thus be seen that the toothed wheel 12 can be started into high speed rotation and stopped from such rotation substantially instantaneously in response to the selective energization and de-energization of the solenoid 18. Depending on the energization of the solenoid 18, the toothed wheel 12 can be controlled to rotate for a distance equal to a predetermined number of teeth 13 or revolutions or portions of a revolution.

The invention is not limited to employing a magnetic device, such as the solenoid 18. The function of the magnetic device can be performed by mechanical control devices, such as a cam arrangement.

The wheel 12 is not restricted to having equally spaced projections on its periphery. Wheel 12 may have a plurality of projections which are unequally spaced on its periphery, depending on the application of use of the invention. Moreover, wheel 12 need not have a plurality of projections or teeth, but may be provided with only one projection or tooth.

Having thus described only one possible embodiment of the present invention, it is desired to emphasize that other modifications may be resorted to in a manner limited only by the following claims:

What is claimed is:

1. A rotary positioning apparatus comprising:
a first member having at least one projection,
a second member having a resilient element,
driving means urging said first and second members to rotate,
a pivotal member having first and second arms, said first arm normally engaging said projection to prevent said first member from rotating, said second arm normally penetrating slightly said resilient element and at predetermined times penetrating deeper into said resilent element, and
a control device for urging said first arm out of engagement with said projection and for holding said first arm out of engagement with said projection against the pressure of said resilient element on said second arm.

2. A rotary positioning apparatus comprising:
a first member having at least one projection,
a second member having a yieldable element,
driving means urging said first and second members to rotate,
a pivotal member having first and second arms, said first arm normally engaging said projection to prevent said first and second members from rotating, said second arm normally engaging said yieldable element and at predetermined times embedding itself deeper into said yieldable element, and
a mechanical control device for urging said first arm out of engagement with said projection and for holding said first arm out of engagement with said projection against the pressure of said yieldable element on said second arm.

3. A high speed mechanical positioning mechanism comprising:
rotary means having on their periphery a plurality of projections and a resilient belt which does not harden with age,
driving means urging said rotary means to rotate,
a pivotal member having first and second arms, said first arm normally engaging at least one of said projections to prevent said rotary means from rotating, said second arm normally engaging slightly said resilient belt but engaging deeper into said belt when said rotary means is rotated, and
a magnetic device for urging said first arm out of engagement with said projections when said device is energized and for urging said first arm in contact with said device against the pressure of said resilient belt on said second arm.

4. An escapement device, comprising, in combination:
a wheel having a plurality of projections spaced equally about its periphery,
rotatable means connected to said wheel and having a cylindrical periphery composed of a yieldable substance,
means urging said wheel and rotatable means to rotate,
a pivotal member having first and second arms, said first arm normally engaging at least one of said projections to prevent said wheel from rotating, said second arm normally engaging slightly said yieldable substance and engaging deeper into said substance when said wheel is free to rotate, and
a solenoid for urging said first arm out of engagement with said projections when said solenoid is energized.

5. In a device of the character described:
a rotary driving element,
a rotary driven element,
said elements having a common axis of rotation,
said driven element having an elastic belt secured to its circumference and said driving element having a series of teeth parallel to said belt,
an oscillatory two-armed member disposed tangentially of said belt and teeth,
a first arm of said oscillatory member for cooperating selectively with said teeth,
a second arm of said oscillatory member for cooperating selectively with said belt,
an electromagnet having a pole face to attract said first arm away from cooperation with said teeth and to hold said first arm in opposition to the elastic force of said belt on said second arm.

6. Apparatus for selectively controlling the incremental rotation of a wheel having teeth representing various digits, comprising, in combination, a wheel having a plurality of teeth spaced equally about its periphery, rotatable means connected to said wheel by a clutch and having a cylindrical periphery composed of a resilient material which does not harden with age, means urging said wheel and rotatable means to rotate, a pivotal member having first and second arms, said first arm normally engaging at least one of said teeth to prevent said wheel from rotating, said second arm normally engaging slightly said resilient material but engaging deeper into said material when said wheel is rotated, and a selectively-energizable electromagnet for urging said first amount of engagement with said teeth when said electromagnet is energized and for holding said first arm in contact with said electromagnet against the pressure of said resilient material on said second arm.

7. An indexing apparatus comprising, in combination, a motor, a toothed wheel mounted for rotation, rotatable means connected to said wheel to rotate therewith, said rotatable means having a layer of resilient material affixed to its cylindrical periphery, a clutch for connecting said motor to said rotatable means or to said toothed wheel, a solenoid disposed adjacent said toothed wheel, and a bifurcated armature pivotally mounted adjacent said toothed wheel, said armature having a first arm for engaging the teeth on said toothed wheel and for moving out of engagement with said teeth when said solenoid is energized, said armature having a second arm carrying an element for penetrating said layer of resilient material at predetermined times, whereby said toothed wheel may be indexed or rotated rapidly for a distance equal to a predetermined number of teeth of said wheel and then stopped rapidly when said solenoid is de-energized.

8. An apparatus for controlling the motion of rotatable means, comprising, in combination, rotatable means having cam-like surfaces on the outer surface of a first element and a resilient material on the outer surface of a second element, power means urging said rotatable means to rotate, a pivotable member having a first end for engaging at least one of said cam-like surfaces at predetermined times and a second end for embedding itself into said resilient material at times other than said predetermined times, a selectively energizable magnetic device positioned adjacent said first end and said cam-like surfaces for causing disengagement of said first end from said cam-like surfaces, so that when said magnetic device is unenergized a first condition prevails whereby said first end engages at least one of said cam-like surfaces to impede the motion of said rotatable means and said second end engages slightly said resilient material, and when said magnetic device is energized a second condition prevails whereby said first end does not engage any of said cam-like surfaces and said second end engages deeply said resilient material.

9. An apparatus for selectively indexing or rotating a toothed wheel for predetermined portions of a complete revolution, comprising, in combination, a motor, a first wheel having ten teeth spaced equally about its periphery, a second wheel having a layer of neoprene secured to its periphery, a clutch for connecting said motor to said first wheel and second wheel to rotate therewith, a selectively energizable solenoid positioned adjacent said teeth, a pivotable bifurcated member normally in a first position so that one of its arms engages a tooth on said first wheel thus preventing said first wheel from rotating and the other one of its arms engages slightly said neoprene layer, whereby said solenoid when energized attracts said one arm toward said solenoid so that said first wheel starts rotating and said second wheel is still motionless under the urge of said motor and clutch and said pivotable member is pivoted to a second position wherein said other one of its arms embeds itself into said neoprene layer while said first and second wheels rotate, whereupon when said solenoid is de-energized said one arm is no longer attracted to said solenoid and said other arm is immediately thrust toward the outer surface of said neoprene layer thus pivoting said pivotable member to said first position, and wherein said energization and de-energization of said solenoid is selected in accordance with a desired tooth position of said first wheel.

10. A mechanism for controlling the rotation of rotatable means, comprising, in combination, rotatable means having projections on the periphery of a first element and an elastic material on the periphery of a second element, motive means urging said rotatable means to rotate, a magnetic device disposed adjacent said projections, a pivotable member having a first arm disposed between said magnetic device and said projections and a second arm contacting said elastic material, said first arm engaging at least one of said projections when said magnetic device is unenergized thereby preventing said rotatable means from rotating under the urge of said motive means, said first arm being drawn away from said projections and toward said magnetic device when said magnetic device is energized thereby permitting said rotatable means to rotate under the urge of said motive means, said second arm slightly engaging said elastic material when said magnetic device is unenergized, and said second arm engaging more deeply said elastic material when said magnetic device is energized, whereby upon de-energization of said magnetic device said second arm is thrust toward the outer surface of said elastic material thereby pivoting said pivotable member and bringing said first arm into engagement with at least one of said projections to stop the rotation of said rotatable means.

11. A rotary positioning or indexing apparatus, including a first rotatable member having at least one projection, a second rotatable member having a resilient element, driving means urging said first and second members to rotate, a movable member having a first portion normally contacting a projection of said first rotatable member to prevent said first rotatable member from rotating, said movable member having a second portion arranged to penetrate into said resilient element at predetermined times, and a control device urging said first portion of the movable member out of contact with said projection of the first rotatable member and holding said first portion of the movable member out of contact with the projection against the force exerted by the resilient element on the second portion of the movable member.

References Cited by the Examiner

UNITED STATES PATENTS

| | | | |
|---|---|---|---|
| 2,514,175 | 7/1950 | Beckman | 192—26 |
| 2,711,237 | 6/1955 | Wylie | 192—148 X |
| 2,954,108 | 9/1960 | Lenney | 192—22 X |

DAVID J. WILLIAMOWSKY, *Primary Examiner.*

A. T. McKEON, *Assistant Examiner.*